(12) United States Patent
MacInnis et al.

(10) Patent No.: US 8,588,513 B2
(45) Date of Patent: Nov. 19, 2013

(54) METHOD AND SYSTEM FOR MOTION COMPENSATION

(75) Inventors: Alexander MacInnis, Lake Oswego, OR (US); Sheng Zhong, San Jose, CA (US); Chenhui Feng, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1923 days.

(21) Appl. No.: 11/486,331

(22) Filed: Jul. 13, 2006

(65) Prior Publication Data

US 2007/0014477 A1  Jan. 18, 2007

Related U.S. Application Data

(60) Provisional application No. 60/701,181, filed on Jul. 18, 2005.

(51) Int. Cl.
*G06K 9/00* (2006.01)

(52) U.S. Cl.
USPC .......................................................... 382/154

(58) Field of Classification Search
USPC ............... 382/103, 107, 236, 238; 348/208.4, 348/208.6, 208.13, 208.14; 375/240.16, 375/240.17
See application file for complete search history.

(56) References Cited

U.S. PATENT DOCUMENTS

| | | | | |
|---|---|---|---|---|
| 4,307,420 A * | 12/1981 | Ninomiya et al. | ....... | 375/240.14 |
| 4,992,870 A * | 2/1991 | Samad | ........................... | 348/441 |
| 5,072,293 A * | 12/1991 | De Haan et al. | ............. | 348/699 |
| 5,157,732 A * | 10/1992 | Ishii et al. | .................... | 382/107 |
| 5,351,095 A * | 9/1994 | Kerdranvat | .................... | 348/699 |
| 5,546,130 A * | 8/1996 | Hackett et al. | ................ | 348/447 |
| 5,557,341 A * | 9/1996 | Weiss et al. | .................... | 348/699 |
| 5,594,504 A * | 1/1997 | Ebrahimi | ................... | 375/240.16 |
| 5,995,154 A * | 11/1999 | Heimburger | ................. | 348/448 |
| 6,005,626 A * | 12/1999 | Ding | ......................... | 375/240.16 |
| 6,009,185 A * | 12/1999 | DeAngelis et al. | ........... | 382/107 |
| 6,078,618 A * | 6/2000 | Yokoyama et al. | ........... | 375/240 |
| 6,122,320 A * | 9/2000 | Bellifemine et al. | ........ | 375/240 |
| 6,141,451 A * | 10/2000 | Kumaki et al. | ............... | 382/238 |
| 6,442,202 B1 * | 8/2002 | Borer | ....................... | 375/240.16 |
| 6,462,791 B1 * | 10/2002 | Zhu | .......................... | 375/240.27 |
| 6,532,264 B1 * | 3/2003 | Kahn | ....................... | 375/240.16 |
| 6,567,469 B1 * | 5/2003 | Rackett | ..................... | 375/240.16 |
| 6,721,360 B2 * | 4/2004 | Itokawa | .................... | 375/240.11 |
| 6,798,837 B1 * | 9/2004 | Uenoyama et al. | ...... | 375/240.16 |
| 6,931,065 B2 * | 8/2005 | Kim | ......................... | 375/240.16 |
| 7,023,921 B2 * | 4/2006 | Subramaniyan et al. | | 375/240.16 |
| 7,197,074 B2 * | 3/2007 | Biswas et al. | ............ | 375/240.16 |
| 7,268,835 B2 * | 9/2007 | Babonneau et al. | .......... | 348/607 |
| 7,693,218 B2 * | 4/2010 | Hubrich et al. | .......... | 375/240.16 |
| 7,720,296 B2 * | 5/2010 | Hahn et al. | ..................... | 382/236 |
| 2003/0053543 A1 * | 3/2003 | Bhaumik et al. | .......... | 375/240.16 |
| 2004/0252764 A1 * | 12/2004 | Hur et al. | ................. | 375/240.16 |
| 2005/0286638 A1 * | 12/2005 | Watanabe | ................ | 375/240.16 |
| 2006/0188013 A1 * | 8/2006 | Coimbra et al. | ........... | 375/240.2 |
| 2006/0233258 A1 * | 10/2006 | Holcomb | .................. | 375/240.21 |
| 2007/0014365 A1 * | 1/2007 | MacInnis | ................. | 375/240.16 |
| 2008/0144716 A1 * | 6/2008 | De Haan | .................. | 375/240.16 |

FOREIGN PATENT DOCUMENTS

WO    WO 0174082 A1 *  10/2001

\* cited by examiner

*Primary Examiner* — Vikkram Bali
(74) *Attorney, Agent, or Firm* — Thomas | Horstemeyer, LLP

(57) ABSTRACT

Described herein is a method and system for motion compensation. This system and method use confidence for motion vector selection. Relative cost and an estimate of noise power may be used to characterize residual values and influence confidence determination.

23 Claims, 4 Drawing Sheets

METHOD AND SYSTEM FOR MOTION COMPENSATION

RELATED APPLICATIONS

This application claims priority to "METHOD AND SYSTEM FOR MOTION COMPENSATION", Provisional Application for U.S. Patent, Ser. No. 60/701,181, filed Jul. 18, 2005, by MacInnis, which is incorporated by reference herein for all purposes.

This application is related to the following applications, each of which is hereby incorporated herein by reference in its entirety for all purposes:

U.S. Provisional Patent Application Ser. No. 60/701,179, METHOD AND SYSTEM FOR NOISE REDUCTION WITH A MOTION COMPENSATED TEMPORAL FILTER, filed Jul. 18, 2005 by MacInnis;

U.S. Provisional Patent Application Ser. No. 60/701,180, METHOD AND SYSTEM FOR VIDEO EVALUATION IN THE PRESENCE OF CROSS-CHROMA INTERFERENCE, filed Jul. 18, 2005 by MacInnis;

U.S. Provisional Patent Application Ser. No. 60/701,178, METHOD AND SYSTEM FOR ADAPTIVE FILM GRAIN NOISE PROCESSING, filed Jul. 18, 2005 by MacInnis;

U.S. Provisional Patent Application Ser. No. 60/701,177, METHOD AND SYSTEM FOR ESTIMATING NOISE IN VIDEO DATA, filed Jul. 18, 2005 by MacInnis;

U.S. Provisional Patent Application Ser. No. 60/701,182, METHOD AND SYSTEM FOR MOTION ESTIMATION, filed Jul. 18, 2005 by MacInnis;

U.S. patent application Ser. No. 11/314,679, METHOD AND SYSTEM FOR ANALOG VIDEO NOISE REDUCTION BY BLENDING FIR AND IIR FILTERING, filed Dec. 20, 2005 by Zhong; and U.S. patent application Ser. No. 11/314,680, METHOD AND SYSTEM FOR CONTENT ADAPTIVE ANALOG VIDEO NOISE DETECTION, filed Dec. 20, 2005 by Zhong et al.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoding may utilize a combination of intra-coding and inter-coding. Intra-coding is based on information that is contained in the picture itself. Inter-coding uses motion estimation and motion compensation based on previously encoded pictures. The encoding process for motion estimation consists of selecting motion data that describes a displacement applied to samples of a previously encoded picture.

Other video processing systems may also rely on accurate motion compensation through optimization of candidate motion vectors. As the number of motion vectors increases, selection may become very complex, and optimization can be difficult given the constraints of some hardware.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for motion compensation, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for motion compensation are presented. This system and method use confidence for motion vector selection. Relative cost and an estimate of noise power may be used to characterize residual values.

Residual Values

The difference between two samples may be utilized for the analysis of an uncorrelated property. For example, a first sample may contain a first signal portion and a first noise portion, and a second sample may contain a second signal portion and a second noise portion:

$$X_1 = S_1 + N_1$$

$$X_2 = S_2 + N_2$$

If the signal portions are identical and the noise portions are uncorrelated, the difference is a third noise portion:

$$X_2 - X_1 = N_3$$

If the first noise portion and the second noise portion are normally distributed random variables with a mean and variance of $(\mu, \sigma^2/2)$, the third noise portion is a normally distributed random variable with a mean and variance of $(0, \sigma^2)$.

In video processing applications, the residual value may be the difference between two pixel values. When both pixel values contain the same content but different normally distributed random source noise, the residual noise variance is twice the source noise variance:

$$\sigma^2_{residual} = 2\sigma^2_{source}$$

Sum of Signed Difference (SSD)

Figure 1:
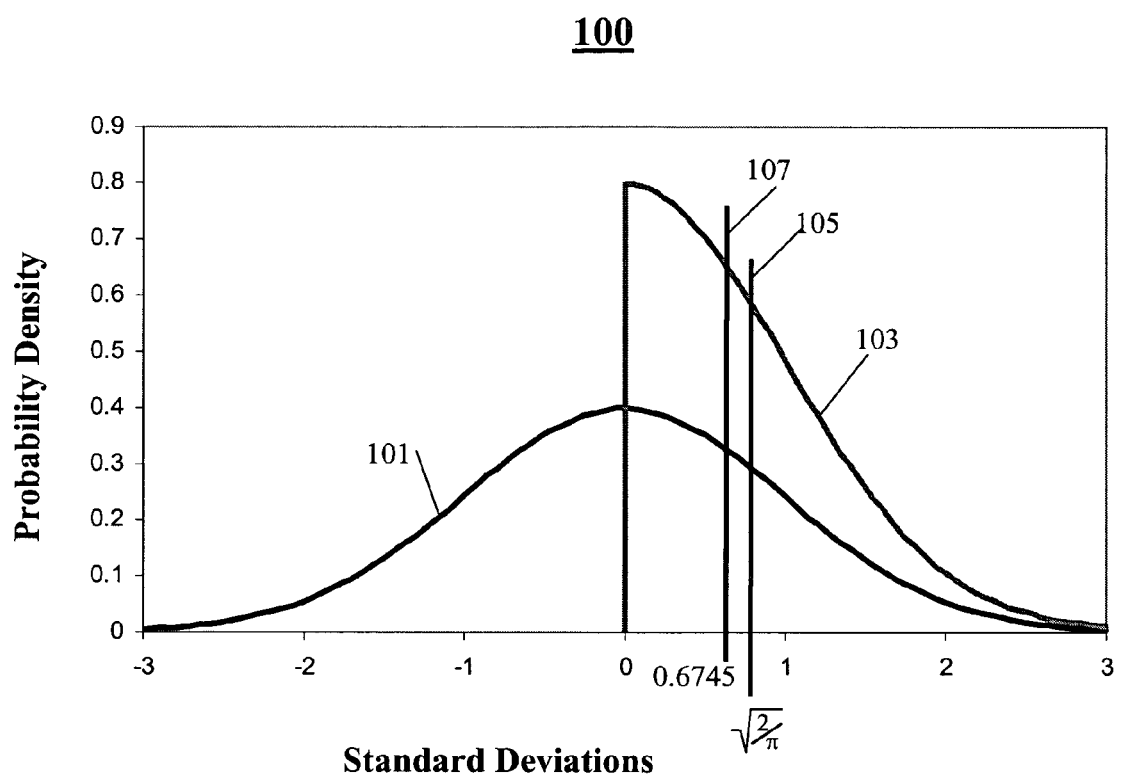
FIG. 1 is a graph of normalized SAD and SSD values in accordance with an embodiment of the present invention.

The SSD is the sum of residuals. Dividing by the number of residuals may normalize the SSD. FIG. 1 is a graph 100 that illustrates the probability density function of the normalized SSD value 101 in accordance with an embodiment of the present invention. When source noise is normally distributed and the SSD is normalized, the probability density function 101, mean, and median may be as follows:

$$PDF_{SSD}(x) = \exp(-x^2/2\sigma^2_{residual})/[\text{sqrt}(2\pi)\sigma_{residual}]$$

$$\mu_{SSD} = 0$$

$$\text{median}_{SSD} = 0$$

Sum of Absolute Difference (SAD)

The SAD is the sum of the absolute values of residuals. Dividing by the number of residuals may normalize the SAD. FIG. 1 illustrates the probability density function of the normalized SAD value 103. When analog noise is normally distributed, the SAD has a half-normal distribution. When the SAD is normalized, the probability density function 103, mean 105, and median 107 may be as follows:

$$PDF_{SAD}(x) = 2 * \exp(-x^2/2\sigma^2_{residual})/[\text{sqrt}(2\pi)\sigma_{residual}]$$

$$\mu_{SAD} = \text{sqrt}(2/\pi)\sigma_{residual}$$

$$\text{median}_{SAD} = 0.6745\ \sigma_{residual}$$

Noise Probability (P-Hat)

P-hat may be the number of times that the absolute value of a residual exceeds a threshold. The threshold may be determined based on the estimated residual noise standard deviation. For example, the threshold may be set to the median value 107 of the normalized SAD as shown in FIG. 1. P-hat may be a binomial distribution of obtaining m success out of M Bernoulli trials. When the threshold is set to the median value 107, each Bernoulli trial has a 50% probability. As M increases, the binomial distribution may be approximated by the normal probability density function:

$$PDF_{P\text{-}hat}(m) = \exp(-(m-\mu)^2/2\sigma^2_{p\text{-}hat})/[\text{sqrt}(2\pi)\sigma_{P\text{-}hat}]$$

$$\mu_{P\text{-}hat} = M/2$$

$$\sigma^2_{P\text{-}hat} = M/4$$

Figure 2:
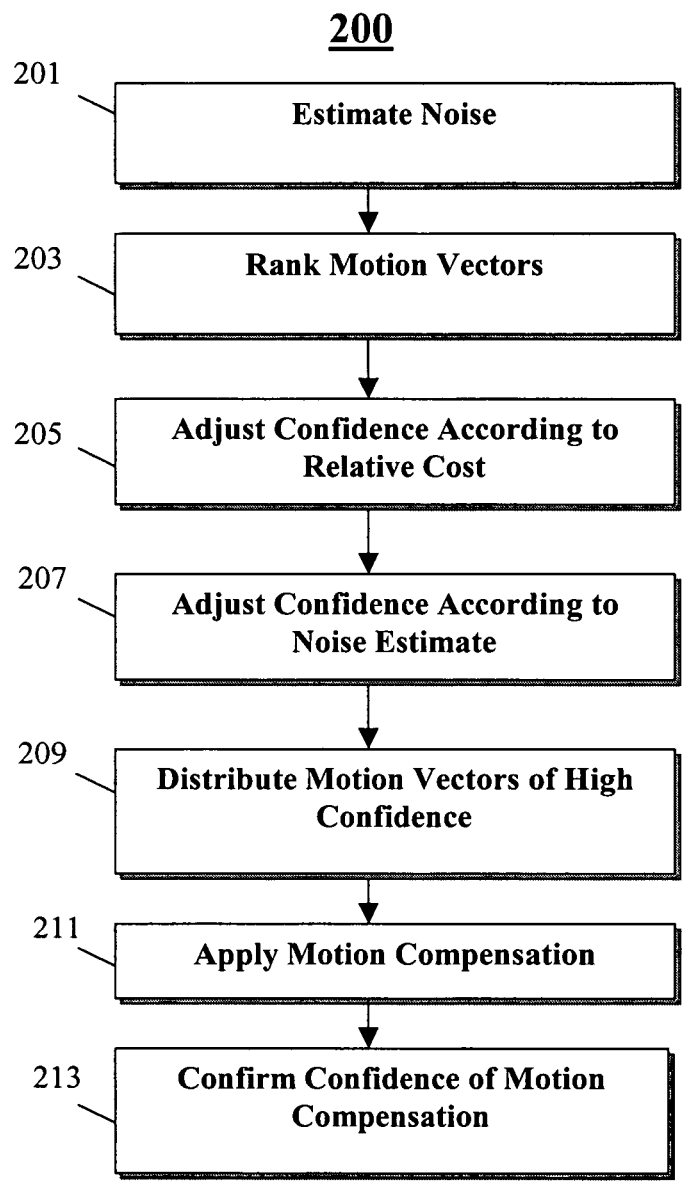
FIG. 2 is a flow diagram of an exemplary method for motion compensation in accordance with an embodiment of the present invention.

FIG. 2 is a flow diagram, 200, of an exemplary method for motion compensation in accordance with an embodiment of the present invention.

At 201, noise is estimated. Noise power can be measured from the average residual power in a static sequence.

Alternatively, noise estimation can be found in the system(s), method(s), or apparatus described in METHOD AND SYSTEM FOR ESTIMATING NOISE IN VIDEO DATA, filed Jul. 18, 2005 by MacInnis, which is incorporated herein by reference for all purposes.

The noise reduction in certain embodiments of the present invention can be based on the system(s), method(s), or apparatus described in METHOD AND SYSTEM FOR ANALOG VIDEO NOISE REDUCTION BY BLENDING FIR AND IIR FILTERING, Ser. No. 11/314,679, filed Dec. 20, 2005 by Zhong, and incorporated herein by reference for all purposes.

The noise detection in certain embodiments of the present invention can be based on the system(s), method(s), or apparatus described in METHOD AND SYSTEM FOR CONTENT ADAPTIVE ANALOG VIDEO NOISE DETECTION, Ser. No. 11/314,680, filed Dec. 20, 2005 by Zhong et al., and incorporated herein by reference for all purposes.

Motion vectors may be generated and cost metrics may be associated with each motion vector. At 203, cost metrics are used to rank the motion vectors. An ordered list of the motion vectors having the lowest cost may be generated.

At 205, an initial confidence may be attributed to this ordering. If motion vectors in the ordered list have similar metric values, the associated confidence is reduced since one motion vector is not clearly discernable from the other. "Similar" can be based on the measured noise in the system. If the difference between costs for consecutive motion vectors in the ordered list is larger than would be predicted by the residual noise estimation, the confidence in the lower-cost motion vector is increased.

There can be a high confidence in one axis and low confidence in the other axis. For example if an image with a vertical edge is moved horizontally, there is a series of motion vectors all of which have the same horizontal displacement. The horizontal displacement is accurately represented, but the vertical displacement is difficult to estimate since the residual in the vertical axis is primarily noise. It may be advantageous to maintain the horizontal and the vertical confidence functions independently. A motion vector may be confident in both axes, confident in one axis, or confident in the other axis. If there is a horizontal edge, it may be more vertically confident, and if there is a vertical edge, it may be more horizontally confident.

Confidence may be based on SAD, SSD, and/or P-hat. Metrics, such as SAD, SSD, and P-hat, can be combined together as a basis for confidence. To combine metrics, the expected value of each can be subtracted from the actual metric and the difference can be scaled to generate a range of values that have a distribution based on the sigma (i.e. standard deviation) of the noise. Each metric should have the same zero point and the same range prior to combination. The combination may be a weighted sum of the scaled metric differences. The result closest to zero has the lowest cost and the highest initial confidence.

The SAD has an expected value that is a function of noise and the window size, i.e. the number of differences calculated. Whereas, the SSD has a mean of zero for zero-mean noise. Subtracting a predetermined expected value (i.e. mean) of the SAD from the SAD measurement may improve evaluation. There may be motion vectors with low confidence that result in SAD values that are less than the expected value.

At 207, confidence may be adjusted according to the noise estimate. Examining the characteristics of the residual may include comparing the magnitude of the residual to a previously obtained noise distribution. The P_hat metric can be used to compare a small set of residuals to a threshold based on the noise estimate. If the residual falls within the bounds of the noise distribution, confidence is high. If the residual does not fit the noise distribution, the residual may contain content, so the confidence can be low.

The confidence of candidate motion vectors can be compared to the "zero" motion vector (i.e. a static hypothesis). If there are no motion vectors with a higher confidence than the "zero" motion vector, the "zero" motion vector is selected. Picking a wrong non-zero motion vector may create artifacts such as wobbling.

At 209, a motion vector with high confidence may be distributed. To fill in the areas where "zero" motion vectors are selected, a motion vector in a neighboring region with high confidence may be applied to one or more pixels or blocks of pixels.

Motion compensation is applied at 211. At 213, confidence in the motion compensation is confirmed. The residual of the motion compensation output may be characterized to determine the presence of noise and/or content. If there's no content in the residual, the motion compensator may be operating correctly, which indicates for example that a filter may be utilized to reduce noise, or that coding can be optimized for the case of only noise in the residual. If there is content in the residual, filtering may be reduced to prevent blurring or other kinds of artifacts, or coding may be optimized for the case of content and noise in the residual.

Filters capable of noise reduction can be found in the system(s), method(s), or apparatus described in METHOD AND SYSTEM FOR NOISE REDUCTION WITH A MOTION COMPENSATED TEMPORAL FILTER, filed Jul. 18, 2005 by MacInnis, which is incorporated herein by reference for all purposes.

Figure 3:
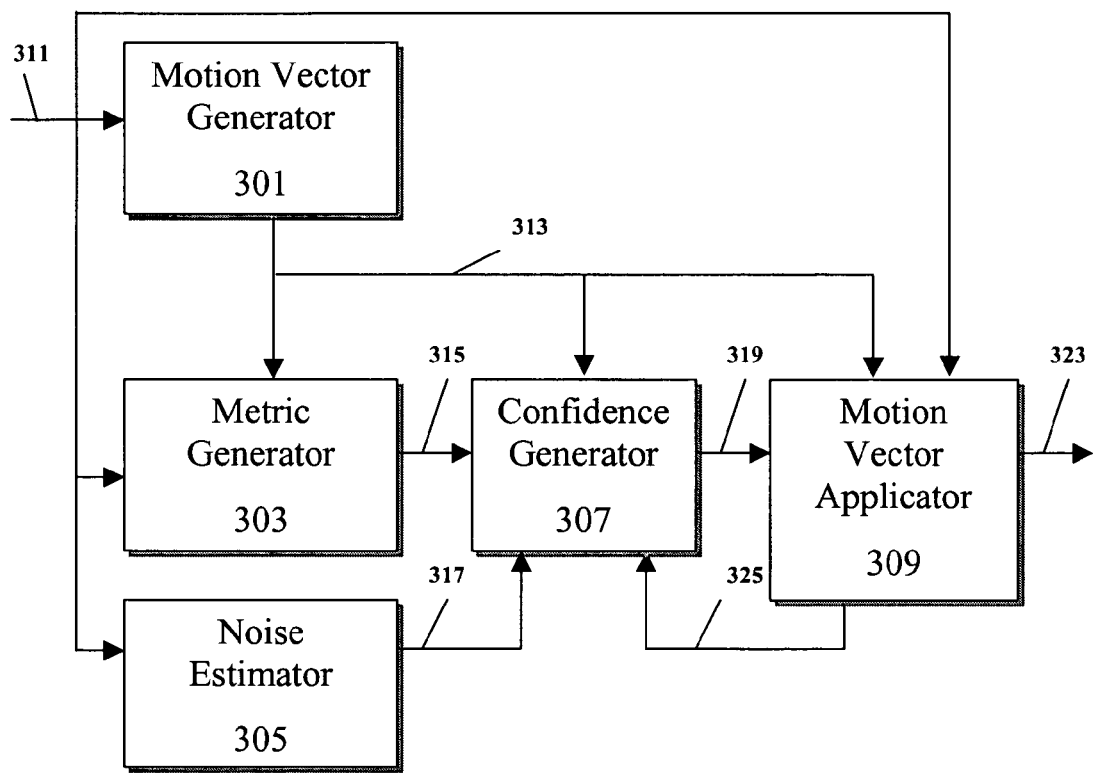
FIG. 3 is a block diagram for motion compensation in accordance with an embodiment of the present invention.

FIG. 3 is a block diagram, 300, of a system for motion compensation in accordance with an embodiment of the present invention. The system comprises a motion vector generator 301, a metric generator 303, a noise estimator 305, a confidence generator 307, and a motion vector applicator 309.

The motion vector generator 301 may generate a set of motion vectors 313. The motion vectors 313 describe a temporal and spatial displacement between a current video block and one or more reference video blocks in a video sequence 311.

The metric generator 303 may receive the motion vectors 313 and generate a cost metric for each. The cost metric may be SAD, SSD, P-hat, or a combination thereof.

The noise estimator 305 may generate an estimate of the noise power 317 based on the residual values associated with a static sequence. The noise power estimate 317 may be generated prior to motion vector generation and may be updated periodically.

The confidence generator 307 receives the motion vectors 313, cost metrics 315, and noise estimate 317. The cost metrics 315 may be used to rank the motion vectors 313. An ordered list of the motion vectors having the lowest cost may be generated within the confidence generator 307. An initial confidence may be attributed to this ordering. If motion vectors in the ordered list have similar metric values, the associated confidence is reduced since one motion vector may not be clearly discernable from the other. If the difference between costs for consecutive motion vectors in the ordered list is larger than would be predicted by the residual noise estimation, the confidence in the lower-cost motion vector is increased. If the residual based on a candidate motion vector falls within the bounds of the noise power 317, confidence may be increased. If the residual does not fit the noise distribution 317, the residual may contain content, and the confidence may be decreased. The confidence of candidate motion vectors can be compared to the "zero" motion vector (i.e. a static hypothesis). If there are no motion vectors with significantly higher confidence than the "zero" motion vector, the "zero" motion vector may be selected. Prior to outputting final confidence 319, motion vectors with high confidence may be distributed. To fill in the areas where "zero" motion vectors are selected, a motion vector in a neighboring region with high confidence may be applied to one or more pixels or blocks of pixels.

Based on confidence 319, the motion vector applicator 309 may apply the motion vector 313 for producing a motion compensated video block 323. The residual 325 of the motion compensation output may be recharacterized by the confidence generator 307 to determine the presence of noise and/or content. If there's no content in the residual, the motion compensator 309 may be operating correctly. Favorable motion compensation may be utilized to reduce noise in a motion compensated temporal filter for example. Favorable motion compensation may be utilized to improve compression efficiency in a video encoding system.

Figure 4A:
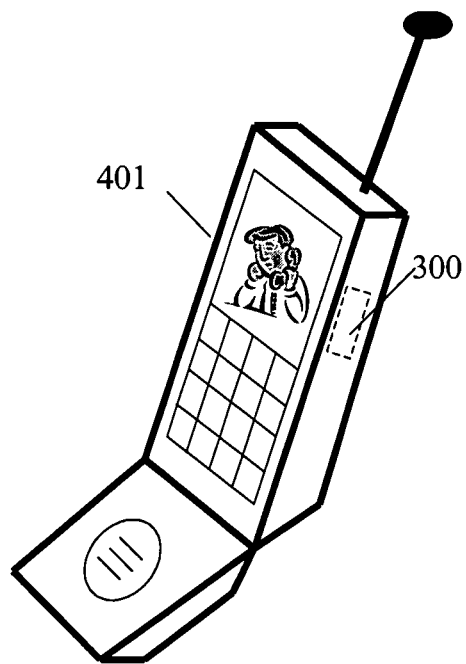
FIG. 4A is a picture of an exemplary communication device in accordance with an embodiment of the present invention.

FIG. 4A is a picture of an exemplary communication device in accordance with an embodiment of the present invention. A mobile telephone 401 equipped with video capture and/or display may comprise the system 300 with motion estimation.

Figure 4B:
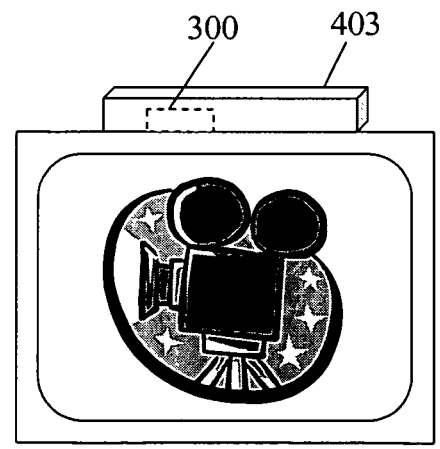
FIG. 4B is a picture of an exemplary video display device in accordance with an embodiment of the present invention.

FIG. 4B is a picture of an exemplary video display device in accordance with an embodiment of the present invention. A set-top box 403 equipped with video capture and/or display may comprise the system 300 with motion estimation.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on arbitrary noisy video, the invention can be applied to a wide variety of video data.

Therefore, it is intended that the present invention not be limited to the particular embodiment disclosed, but that the present invention will include all embodiments falling within the scope of the appended claims.

The invention claimed is:

1. A method for motion compensation comprising:
generating a confidence metric based at least in part on a ranking of a plurality of motion vectors, wherein the ranking is based at least in part on a cost associated with each of the motion vectors, wherein the confidence metric is based at least in part on a noise probability density function; and
selecting a motion vector based at least in part on the confidence metric.

2. The method of claim 1, wherein generating the confidence metric comprises attributing a higher confidence to a motion vector with a lower cost.

3. The method of claim 1, further comprising adjusting the confidence metric based at least in part on a relative difference in the cost between a first motion vector and a second motion vector.

4. The method of claim 3, wherein the relative difference in the cost is compared to a noise level for estimating a presence of video content.

5. The method of claim 3, wherein the confidence metric is greater in the first motion vector based at least in part on the first motion vector having a lower cost than the second motion vector and the relative difference in the cost being large.

6. The method of claim 3, wherein the confidence metric is adjusted in the first motion vector and the second motion vector based at least in part on the relative difference in cost being small.

7. The method of claim 1, wherein the confidence metric has a vertical confidence and a horizontal confidence.

8. The method of claim 1, wherein the cost is a weighted sum of a first measurement and a second measurement, and wherein a first expected value is subtracted from the first measurement prior to a summation.

9. The method of claim 1, wherein generating the confidence metric further comprises eliminating motion vectors that are associated with a cost similar to a zero motion vector cost, and wherein a similarity is based at least in part on a noise level input to a video encoder.

10. The method of claim 1, wherein the method further comprises applying the motion vector to a neighboring region of video based at least in part on the confidence metric.

11. The method of claim 1, wherein following an application of a motion vector, the method further comprises confirming confidence based at least in part on a comparison of a residual value to a noise level.

12. A system for motion compensation, said system comprising:
 a first circuit configured to generate a confidence metric based on a ranking of a plurality of motion vectors, wherein the ranking is based on a cost associated with each of the motion vectors, wherein generating the confidence metric comprises determining a noise probability density function; and
 a second circuit configured to select, based at least in part on the confidence metric, a motion vector from the plurality of motion vectors.

13. The system of claim 12, wherein the first circuit attributes a higher confidence to a motion vector with a lower cost.

14. The system of claim 12, wherein the first circuit adjusts the confidence metric based at least in part on a relative difference in cost between a first motion vector and a second motion vector.

15. The system of claim 14, wherein the first circuit compares the relative difference in cost to a noise level for estimating a presence of video content.

16. The system of claim 14, wherein the first circuit increases confidence in the first motion vector based at least in part on the first motion vector having a lower cost than the second motion vector and the relative difference in cost being large.

17. The system of claim 14, wherein the first circuit decreases confidence in the first motion vector and the second motion vector based at least in part on the relative difference in cost being small.

18. The system of claim 12, wherein the confidence metric has a vertical confidence and a horizontal confidence.

19. The system of claim 12, wherein the first circuit generates the cost with a weighted sum of a first measurement and a second measurement, and wherein a first expected value is subtracted from the first measurement prior to a summation.

20. The system of claim 12, wherein the first circuit is further configured to eliminate motion vectors that are associated with a cost similar to a zero motion vector cost, wherein a similarity is based at least in part on a noise level input to a video encoder.

21. The system of claim 12, wherein the second circuit is further configured to apply the motion vector to a neighboring region of video based at least in part on the confidence metric.

22. The system of claim 12, wherein the first circuit is configured to receive an output of the second circuit to confirm confidence based at least in part on a comparison of a residual value to a noise level.

23. A method for motion compensation comprising:
 determining a ranking of a plurality of motion vectors based at least in part on a cost metric associated with each of the motion vectors;
 generating a confidence metric based at least in part on the ranking of the motion vectors, the confidence metric generated utilizing a noise probability density function;
 adjusting the confidence metric associated with a first one of the motion vectors in response to a similarity of the cost metric associated with a first one of the motion vectors is to the cost metric associated with a second one of the motion vectors, the similarity based at least in part on a measured noise; and
 selecting at least one of the motion vectors based at least in part on the confidence metric associated with the at least one of the motion vectors.

* * * * *